United States Patent
Ito

(10) Patent No.: US 9,835,122 B2
(45) Date of Patent: Dec. 5, 2017

(54) AIRFLOW CONTROL DEVICE OF INTERNAL COMBUSTION ENGINE

(71) Applicant: Toyota Jidosha Kabushiki Kaisha, Toyota-shi, Aichi-ken (JP)

(72) Inventor: Hirokazu Ito, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 192 days.

(21) Appl. No.: 15/001,608

(22) Filed: Jan. 20, 2016

(65) Prior Publication Data

US 2016/0215709 A1    Jul. 28, 2016

(30) Foreign Application Priority Data

Jan. 26, 2015  (JP) ................. 2015-012423

(51) Int. Cl.
| | | |
|---|---|---|
| *F02M 57/04* | (2006.01) | |
| *F02D 33/00* | (2006.01) | |
| *F02D 33/02* | (2006.01) | |
| *F02B 31/04* | (2006.01) | |
| *F02D 41/00* | (2006.01) | |

(52) U.S. Cl.
CPC ............ *F02M 57/04* (2013.01); *F02B 31/04* (2013.01); *F02D 33/006* (2013.01); *F02D 33/02* (2013.01); *F02D 41/0002* (2013.01); *F02D 2200/0414* (2013.01); *F02D 2200/0418* (2013.01); *Y02T 10/146* (2013.01); *Y02T 10/42* (2013.01)

(58) Field of Classification Search
CPC ..... F02M 57/04; F02D 41/0002; F02D 33/02; F02D 33/006; F02D 2200/0414; F02D 2200/0418; F02B 31/04; Y02T 10/42; Y02T 10/146
See application file for complete search history.

(56) References Cited

U.S. PATENT DOCUMENTS

| | | | | |
|---|---|---|---|---|
| 2011/0031886 A1* | 2/2011 | Ikeda | .................. | F01L 3/02 |
| | | | | 315/111.21 |
| 2012/0152198 A1* | 6/2012 | Kim | .................. | B62D 35/00 |
| | | | | 123/188.1 |
| 2016/0069305 A1* | 3/2016 | Ito | .................. | F02M 35/10281 |
| | | | | 123/472 |

FOREIGN PATENT DOCUMENTS

| | | |
|---|---|---|
| JP | H06280659 A | 10/1994 |
| JP | H11247681 A | 9/1999 |
| JP | 2011-047320 A | 3/2011 |
| JP | 2011-142025 A | 7/2011 |
| JP | 2012-180799 A | 9/2012 |
| JP | 2013-155673 A | 8/2013 |

* cited by examiner

*Primary Examiner* — Hieu T Vo
*Assistant Examiner* — Sherman Manley
(74) *Attorney, Agent, or Firm* — Dinsmore & Shohl LLP

(57) ABSTRACT

There is provided an airflow control device of an internal combustion engine comprising: a plasma actuator provided in an intake passage, a fuel injector for port injection provided in the intake passage so as to inject fuel toward the plasma actuator and a control unit for controlling them. The control unit is configured to actuate the plasma actuator after valve opening of an intake valve, in addition to causing the fuel injector to perform an operation of fuel injection, and causing the plasma actuator to perform an operation in a part of a valve closing period of the intake valve. Furthermore, the control unit includes a determination unit to determine whether or not water has adhered to the plasma actuator, and makes port injection operation and plasma actuator operation be performed only when water has adhered.

8 Claims, 11 Drawing Sheets

AIRFLOW CONTROL DEVICE OF INTERNAL COMBUSTION ENGINE

CROSS-REFERENCES TO RELATED APPLICATIONS

This application claims the benefit of Japanese Patent Application No. 2015-012423, filed Jan. 26, 2015, which is hereby incorporated by reference in its entirety.

BACKGROUND

Field

The present disclosure relates to an airflow control device of an internal combustion engine and, in particular, to an airflow control device of an internal combustion engine including a plasma actuator that is provided in an intake passage and controls a direction and strength of an airflow.

Description of the Related Art

In an internal combustion engine for vehicles, and the like, there has been known an airflow control device in which a plasma actuator is provided in a gas passage in order to make a flow in the gas passage controllable without providing a movable part, such as a valve, and in which a flow of gas in the gas passage is controlled by an electrical action of the plasma actuator (refer to Japanese Patent Laid-Open No. 2013-155673 and Japanese Patent Laid-Open No. 2011-142025).

The plasma actuator used herein has: a front surface electrode disposed to be exposed in the gas passage; and a back surface electrode disposed by sandwiching a dielectric between the front surface electrode and itself, and generates an airflow going from the front surface electrode to the back surface electrode by barrier discharge of the dielectric caused by applying an AC voltage between these front surface electrode and back surface electrode, thereby controlling the flow of the gas in the gas passage.

SUMMARY

Incidentally, such a plasma actuator has a problem in which, when water or the like that is a substance with a high dielectric constant adheres to a surface of the plasma actuator, a desired ion flow (plasma) is not generated in the adhesion region and the plasma actuator does not function, as expected, as an actuator inducing an airflow. This particularly means that, in the case where an intake air of the internal combustion engine has a high humidity, and where condensed water is generated in the intake air due to engine operation conditions and the like, an airflow is not induced in the adhesion position and a desired airflow by the plasma actuator cannot be generated, when water droplets of the condensed water adhere to the surface of the plasma actuator.

Consequently, some embodiments disclosed herein have been devised in view of the above-described circumstances, and provide an airflow control device of an internal combustion engine that can make a plasma actuator effectively function.

One embodiment of an airflow control device of an internal combustion engine comprises: a plasma actuator that is provided in an intake passage, and that induces an airflow by being actuated; a fuel injector for port injection which is provided in the intake passage so as to inject fuel toward the plasma actuator or an upstream position thereof; and a control unit for controlling the plasma actuator and the fuel injector for port injection, wherein the control unit is configured to actuate the plasma actuator after valve opening of an intake valve, in addition to causing the fuel injector for port injection to perform an operation of fuel injection, and causing the plasma actuator to perform operation so as to induce the airflow in a direction toward a downstream side of the intake passage, in at least a part of a valve closing period of the intake valve.

Another embodiment of an airflow control device of an internal combustion engine comprises: a plasma actuator that is provided in an intake passage, and that induces an airflow by being actuated; a fuel injector for port injection which is provided in the intake passage so as to inject fuel toward the plasma actuator or an upstream position thereof; and a fuel injector for in-cylinder injection which is provided so as to directly inject fuel to an inside of a cylinder; and a control unit for controlling the plasma actuator, said fuel injector for port injection, and said fuel injector for in-cylinder injection, wherein the control unit is configured to actuate the plasma actuator during a valve opening period after valve opening of an intake valve, and to perform an operation of fuel injection by the fuel injector for in-cylinder injection, in addition to causing the fuel injector for port injection to perform an operation of fuel injection, and causing the plasma actuator to perform an operation so as to induce the airflow in a direction toward a downstream side of the intake passage, in at least apart of a valve closing period of the intake valve.

According to the above-described embodiments, an operation of fuel injection is performed from the fuel injector for port injection toward the plasma actuator provided in the intake passage or the upstream position of the plasma actuator, and the plasma actuator is actuated, in at least the part of the valve closing period of the intake valve. Additionally, the plasma actuator is actuated after the valve opening of the intake valve. Accordingly, even when water has adhered to the surface of the plasma actuator, the adhesion water is removed by the fuel injection operation from the fuel injector for port injection and the operation of the plasma actuator, in the valve closing period of the intake valve. As a result, the plasma actuator can be made to sufficiently function as an actuator inducing an air flow, at the time of the operation of the plasma actuator after the valve opening of the intake valve.

The airflow control devices of the internal combustion engines of the above-described embodiments may further include a determination unit configured to determine whether or not water has adhered to the surface of the plasma actuator, wherein the control unit may be configured to simultaneously cause the fuel injector for port injection to perform an operation of fuel injection, and to cause the plasma actuator to perform an operation so as to induce the airflow in the direction toward the downstream side of the intake passage, in at least the part of the valve closing period of the intake valve, only when the determination unit determines that water has adhered.

According to this mode, only when the determination unit determines that water has adhered to the surface of the plasma actuator, the fuel injection operation by the fuel injector for port injection and the operation of the plasma actuator in the valve closing period of the intake valve are performed. Accordingly, when the determination unit determines that water has not adhered, unnecessary consumption of electric power can be saved since the plasma actuator is not actuated.

Note that the determination unit may perform determination based on a measurement value of a humidity sensor provided in order to measure humidity of the intake air in the intake passage. Furthermore, the determination unit may perform determination based on an estimation result by a unit configured to estimate water adhesion to the surface of the plasma actuator, as described above, by using a humidity and a temperature of an outside air, a temperature of EGR gas at an EGR cooler outlet and an EGR rate, and a temperature of an intake air in an intake manifold.

According to the present disclosure, there can be provided the airflow control device of the internal combustion engine that can make the plasma actuator effectively function.

Further features of the present subject matter will become apparent from the following description of exemplary embodiments (with reference to the attached drawings).

DESCRIPTION OF THE EMBODIMENTS

Hereinafter, embodiments of the present disclosure will be explained based on accompanying drawings.

First Embodiment

Figure 1:
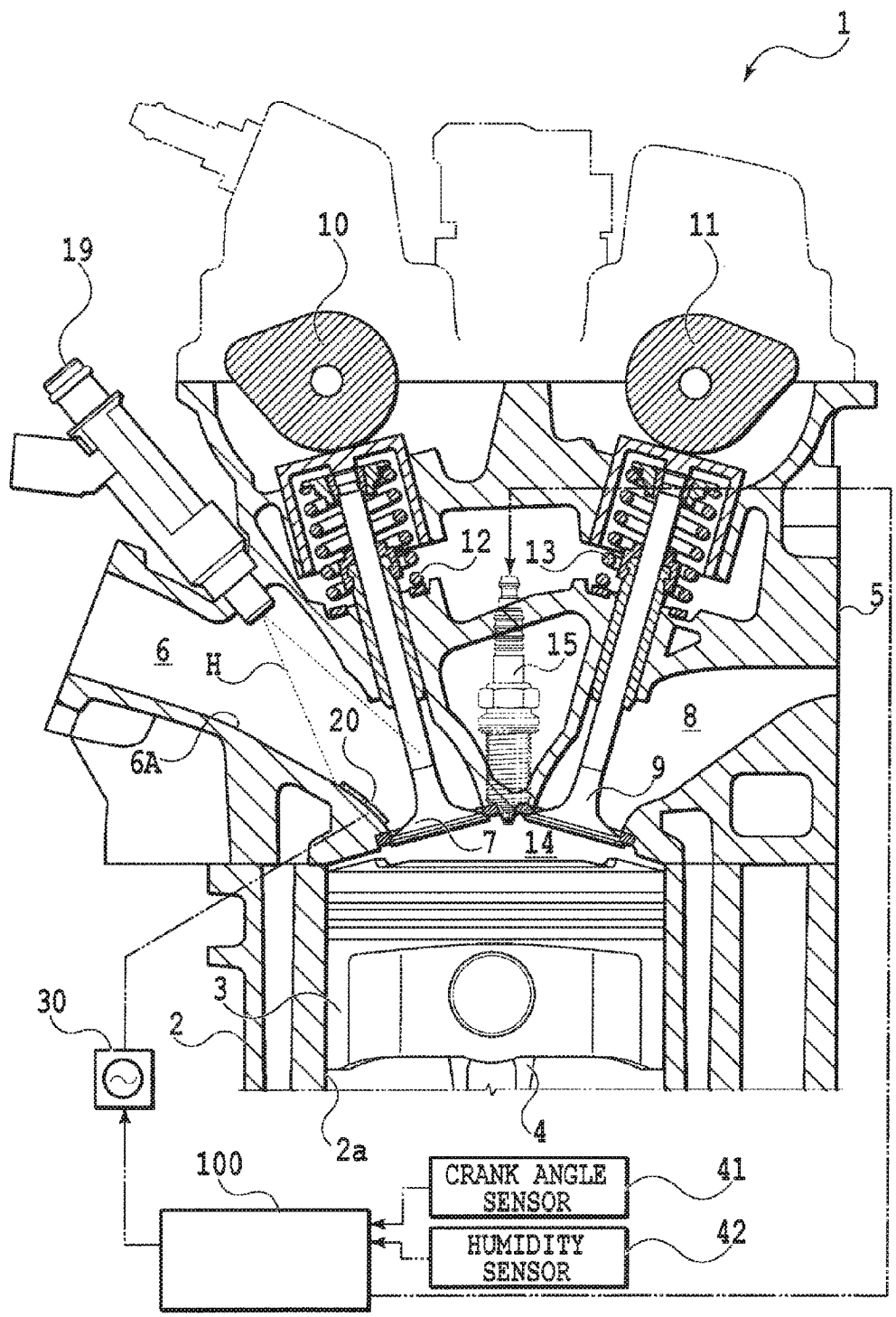
FIG. 1 is a schematic cross-sectional view showing a configuration of a first embodiment applied to an internal combustion engine including only a fuel injector for port injection.

In FIG. 1, there is schematically shown a configuration of a first embodiment applied to an internal combustion engine (an engine) including only a fuel injector for port injection that injects fuel toward an inside of an intake passage (a port). An internal combustion engine 1 is mounted on a vehicle, and is configured as a multi-cylinder (only one cylinder is illustrated) spark ignition-type internal combustion engine (a gasoline engine). However, a type of engine, the number of cylinders, a cylinder disposition form (in-line, V-type, horizontally-opposed, etc.), an ignition type, and the like are not particularly limited and, for example, the engine may be a compression ignition-type internal combustion engine (a diesel engine). A type of vehicle, an application, and the like are not particularly limited, and for example, the vehicle may be a usual vehicle having the engine 1 as an only power source, or may be a hybrid vehicle including two power sources of the engine 1 and an electric motor. In the present embodiment, an electronic control unit (hereinafter referred to as an ECU) 100 as a control unit configured to control the vehicle and the engine is provided.

A piston 3 is reciprocatably housed in a cylinder 2a formed in a cylinder block 2 of the engine 1, and the piston 3 is coupled to a crankshaft (not illustrated) through a connecting rod 4. An intake port 6 forming a part of an intake passage, and an exhaust port 8 forming a part of an exhaust passage are defined in a cylinder head 5 of the engine 1, respectively. An outlet 6B of the intake port 6 is opened and closed by an intake valve 7, and an inlet of the exhaust port 8 is opened and closed by an exhaust valve 9, respectively. The intake valve 7 and the exhaust valve 9 are always biased in a valve closing direction by an intake valve spring 12 and an exhaust valve spring 13, respectively, and are driven in a valve opening direction by an intake camshaft 10 and an exhaust camshaft 11, respectively. The camshafts 10, 11 are coupled to the crankshaft through a power transmission mechanism. A spark plug 15 for igniting an air-fuel mixture present in a combustion chamber 14 in the cylinder 2a is attached to a top portion of the cylinder head 5. Note that a variable valve mechanism (for example, a variable valve timing mechanism) for changing valve opening characteristics of at least one of the intake valve 7 and the exhaust valve 9 may be provided.

An intake manifold or a branch pipe (not illustrated) that forms a part of the intake passage is connected to an upstream side of the intake port 6. A surge tank (not illustrated), which is an intake air collection chamber, is connected to an upstream side of the branch pipe, and it also forms a part of the intake passage. The "intake passage" is a general term of a passage through which an intake air flows. Similarly, the "exhaust passage" is a general term of a passage through which an exhaust air flows.

A plasma actuator 20 inducing an airflow in a direction toward a downstream side of the intake passage is provided, as will be described in detail below, on an inner wall surface 6A near the outlet 6B of the intake port 6 that forms a part of the intake passage. In contrast, a fuel injector for port injection 19 that injects fuel to the intake port 6 is attached to the cylinder head 5 in order to inject fuel toward the plasma actuator 20 or at least a little upstream position thereof.

The spark plug 15 and the fuel injector for port injection 19 are electrically connected to the ECU 100, and are controlled by the ECU 100. In the first embodiment, a crank angle sensor 41 for detecting a crank angle of the engine 1, and a humidity sensor 42 disposed in the intake manifold or the intake port 6 in order to detect a humidity of an intake air of the engine 1 are electrically connected to the ECU 100.

Particularly in the present embodiment, a power supply device 30 including a power source 31, for supplying electrical energy to the plasma actuator 20 is provided. The power supply device 30 is also electrically connected to the ECU 100. By control of the power supply device 30, the ECU 100 changes magnitude of the electrical energy supplied from the power supply device 30 to the plasma actuator 20, or switches operation of the plasma actuator 20.

Here, the plasma actuator 20 of the embodiment will be explained. Note that since a plasma actuator itself is known, a basic configuration and an operation principle thereof will be briefly explained here.

Figure 2:
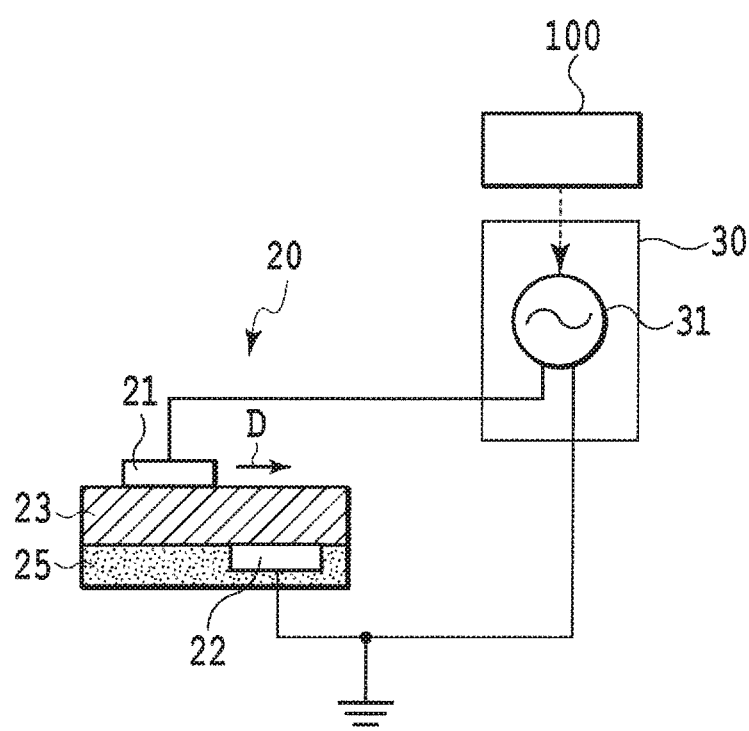
FIG. 2 is a cross-sectional view showing one example of a plasma actuator.

As shown in FIG. 2, the plasma actuator 20 is configured to include a pair of electrodes including a front surface electrode 21 and a back surface electrode 22, and a thin plate-like dielectric 23 disposed between the pair of these electrodes. The back surface electrode 22 is aligned to be offset in an illustrated arrow D direction with respect to the front surface electrode 21 so that a gap is formed between facing-side edges of the both electrodes. The arrow D direction is the downstream side of the intake passage in the present embodiment.

If electrical energy, specifically, a high AC voltage with a high frequency is applied between the front surface electrode 21 and the back surface electrode 22 from the power source 31, plasma is generated near the facing-side edge to the back surface electrode 22 of the front surface electrode 21, and also near a surface of the dielectric 23. A drive force (a blowing force) that makes an air flow in a direction from a front surface electrode 21 side toward a back surface electrode 22 side is generated due to the plasma, and the airflow as shown by an arrow D is induced on the surface of the dielectric 23. The airflow is generated in a region extremely near (approximately 1 to 2 mm) from the surface of the dielectric 23. Such an airflow is called an "actuator airflow" for convenience.

Note that although there are various theories on a principle of generation of such an airflow, according to a theory, for example, when the front surface electrode 21 has a positive potential, an insulation breakdown of the air occurs near the surface of the dielectric 23, thereby ionization is caused, and weakly ionized plasma is generated. Since mobility of electrons is high, the electrons move to the front surface electrode 21 in an extremely short time. In that case, positive ions become excessive, and an electrostatic force is generated by applied electrolysis. The electrostatic force received by the ions is transmitted to neutral particles by collision. When this is seen from a viewpoint of a continuous fluid, a body force (the blowing force) is generated in its space. There is a theory that oxygen negative ions play a large role in the generation of the blowing force in the same direction also when the front surface electrode 21 has a negative potential.

The plasma actuator 20 is installed so that a front surface portion at which the front surface electrode 21 is installed faces an inside of a gas passage in which generation of the airflow is desired, namely, an inside of the intake port 6. On the other hand, since it is not necessary to generate the airflow at a back surface portion of the plasma actuator 20, and the back surface portion rather serves as an adhesion surface to the intake port inner wall surface 6A, the back surface electrode 22 is embedded in an insulating layer 25 formed on a back surface 23B of the dielectric 23 in order to electrically insulate the back surface electrode 22. The insulating layer 25 is also a part of the plasma actuator 20. Note that since the dielectric 23 is formed of a resin-based or a ceramic-based insulating material, the back surface electrode 22 may be embedded in the dielectric 23.

The power supply device 30 changes an output voltage based on a command signal from the ECU 100. The AC voltage output from the power source 31 is, for example, a high voltage of approximately 1 to 10 kV, and has a frequency of approximately 1 to 10 kHz. Note that a DC (direct-current) pulse voltage may be output instead of the AC voltage. Not only magnitude of drive forces generated by the plasma actuator 20 but strength of the airflow can be changed by changing a voltage value output from the power source 31, i.e., by changing magnitude of the voltages applied to the plasma actuator 20. The higher-value voltages are applied, the larger the strength of the airflows generated by the plasma actuator 20 becomes. Note that although it is also considered that a frequency of the voltage is changed in addition to or instead of the magnitude of the voltage in order to change the airflow strength, only the magnitude of the voltage will be changed for convenience here.

A thickness T of the plasma actuator is extremely thin, and it is an order of several to several hundreds μm (the electrodes etc. in Figs. are exaggeratingly depicted). Accordingly, even when the plasma actuator is installed on the inner wall surface 6A of the intake port 6, it does not substantially prevent a flow of the intake air.

Note that the plasma actuator 20 is disposed at an appropriate position of the inner wall surface 6A of the intake port 6 in order to generate an actuator airflow that appropriately strengthens a desired swirl flow or tumble flow generated in the combustion chamber 14, in accordance with an operation state of the engine. Accordingly, the single plasma actuator 20 also may be provided at a part (refer to FIG. 1) of a position in a circumferential direction of the inner wall surface 6A of the intake port 6 corresponding to a flow of a strengthening target or the plurality of plasma actuators 20 may be provided along a flow direction, or they may be provided over a whole circumference.

Now, in an internal combustion engine, condensed water may be generated during intake of an air due to relative humidity of the intake air, an operation condition, and the like. For example, since a dew point in a turbocharging pressure 150 kPa is 35° C. when a temperature of the intake air is 25° C. and the relative humidity is 80% in a turbocharged engine, condensed water maybe easily generated. When the condensed water adheres to a surface of the plasma actuator 20, since water has a high dielectric constant and plasma (an ion flow) is not generated in a portion to which water droplets have adhered, efficiency is lowered because the plasma actuator 20 can operate only in a state of having a spotted surface, thereby causing a problem in which a desired actuator airflow cannot be generated.

This is particularly remarkable when the internal combustion engine includes an exhaust gas recirculation device (referred to as an EGR device), and when EGR gas is contained in the intake air. This is because, when the internal combustion engine includes the EGR device, humidity of the intake air easily becomes much higher, and condensed water is generated even in a lower pressure condition than the above-described turbocharging pressure.

Figure 6:
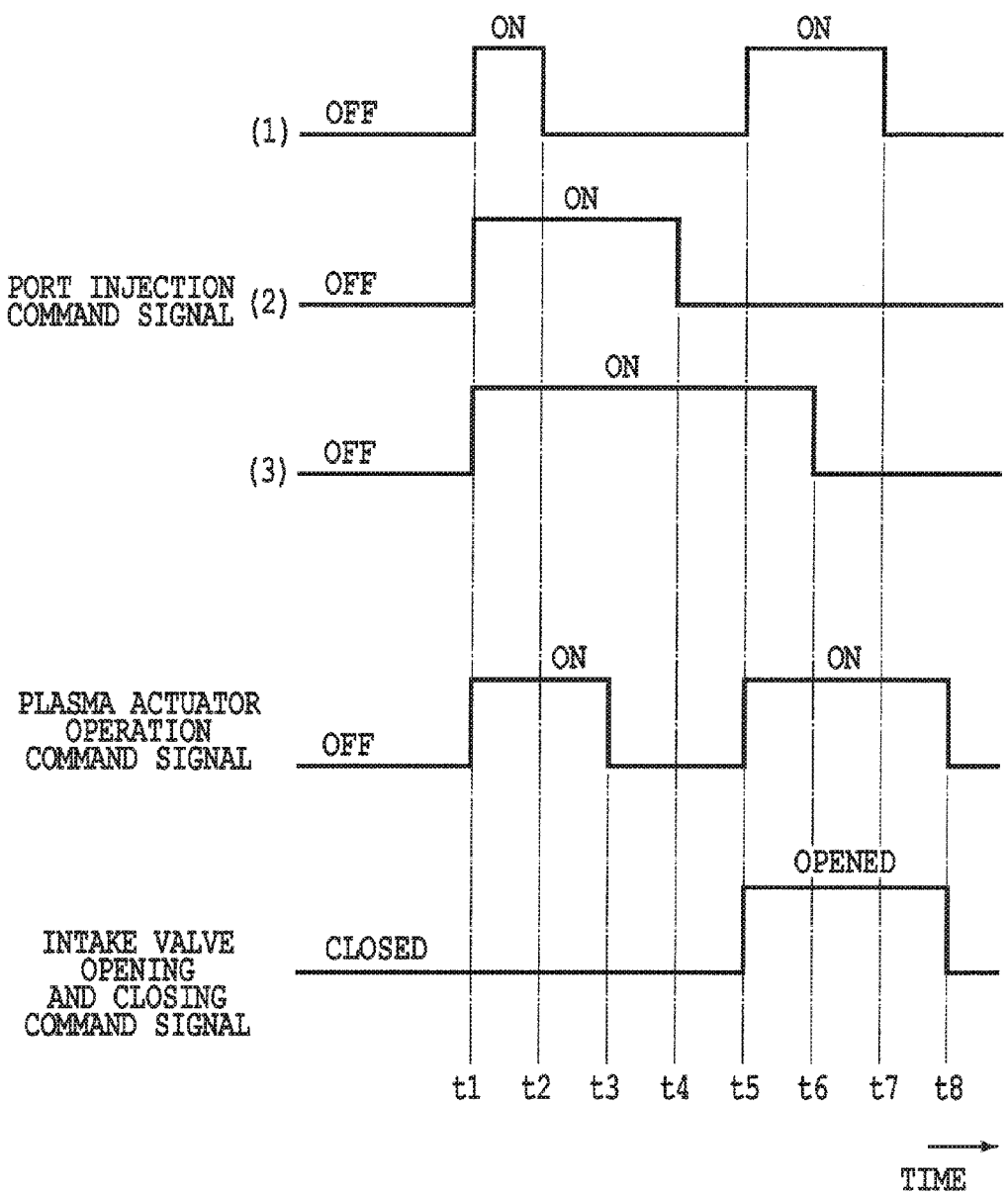
FIG. 6 is a time chart showing contents of control of the first embodiment.

However, the problem can be solved according to the present embodiment. Namely, as shown in FIG. 6, this is because, in the present embodiment, the ECU 100 simultaneously causes the fuel injector for port injection 19 to performs the operation of fuel injection and cause the plasma actuator 20 to perform an operation, in at least a part of a valve closing period before valve opening of the intake valve 7, and then controls the plasma actuator 20 so as to be actuated again after the valve opening of the intake valve 7.

Figure 3A:
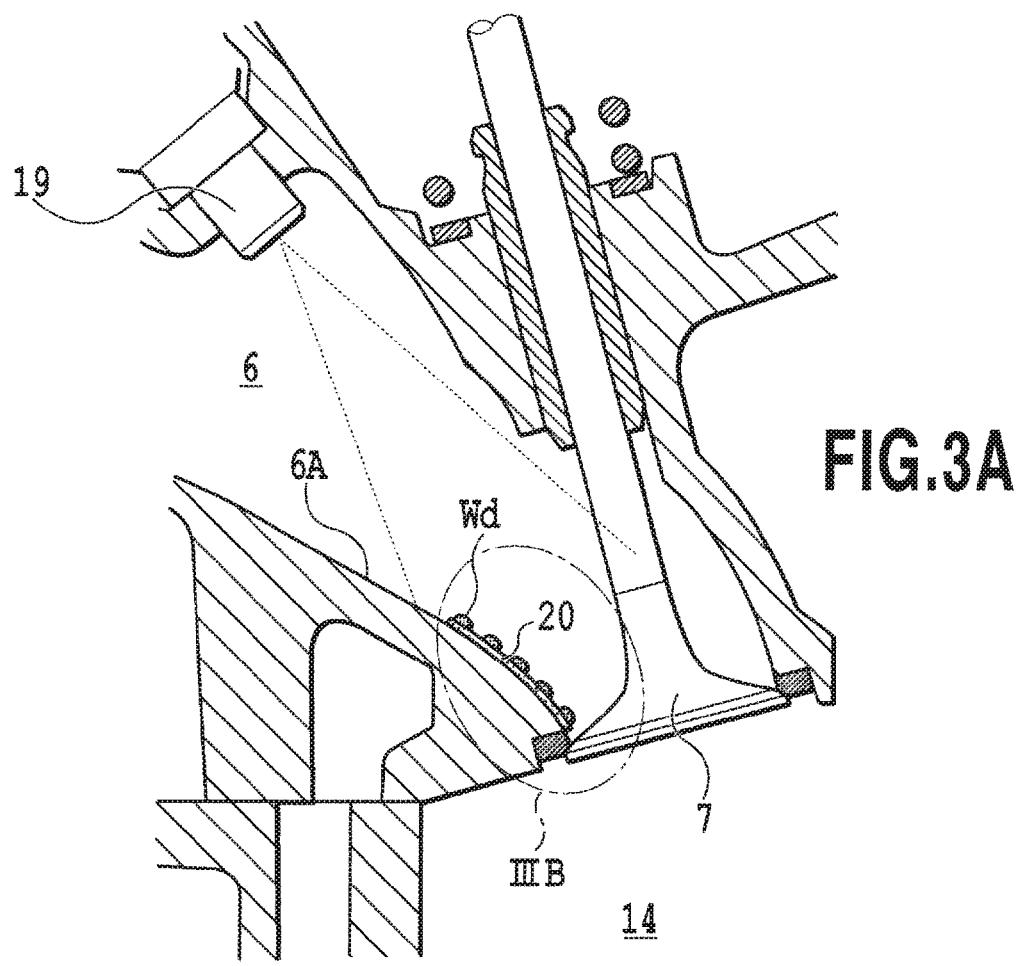
FIG. 3A is a schematic cross-sectional view of a port part showing a state where water has adhered to the plasma actuator.
Figure 3B:
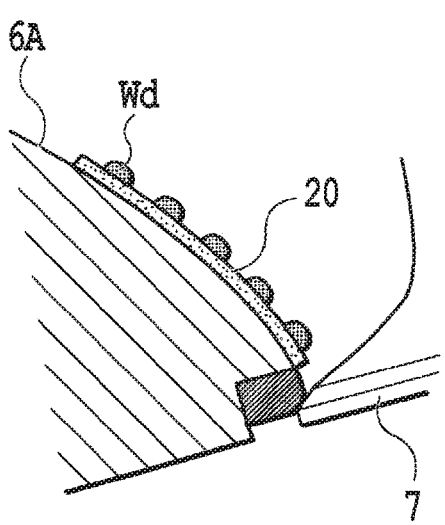
FIG. 3B is an enlarged cross-sectional view of a plasma actuator part of FIG. 3A.

Now, there will be explained a case where a number of water droplets Wd have adhered to the surface of the plasma actuator 20 as shown in FIG. 3. As described above, even if the plasma actuator 20 is actuated in such a state, the desired actuator airflow cannot be generated. However, in the present embodiment, fuel is injected toward the plasma actuator 20 or the upstream position thereof by the fuel injector for port injection 19, and the plasma actuator 20 is actuated, in at least a part of the valve closing period of the intake valve 7. Fuel directly injected onto the surface of the plasma actuator 20, or fuel that is injected to the upstream position of the plasma actuator 20 and that flows down on the surface of the plasma actuator 20 by inclination of the inner wall surface 6A of the intake port 6 is present between a number of water droplets Wd or adjacent thereto as fuel droplets Fd as shown in, for example, FIG. 4.

Figure 4A:
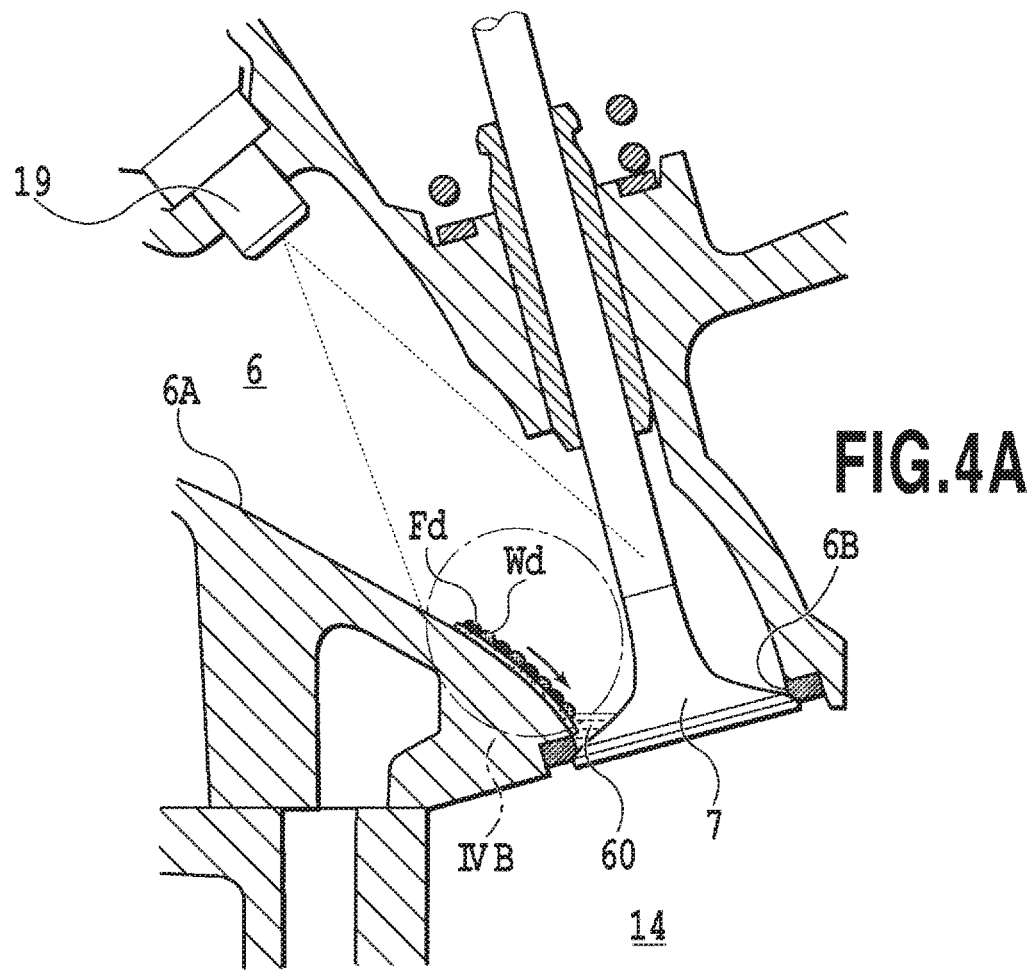
FIG. 4A is a schematic cross-sectional view of the port part showing a situation where the plasma actuator operates in order to move water and fuel having adhered to the plasma actuator.
Figure 4B:
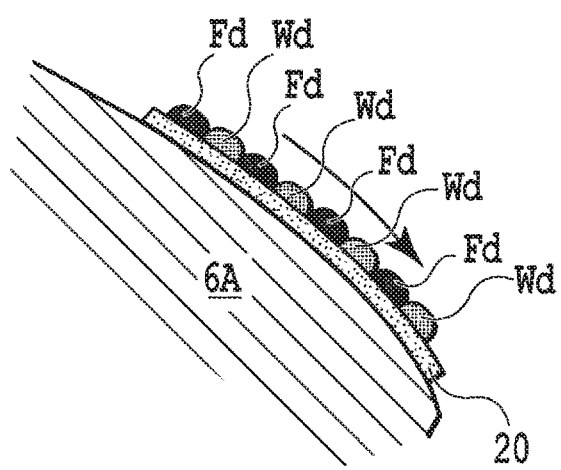
FIG. 4B is an enlarged cross-sectional view of a plasma actuator part of FIG. 4A.
Figure 5:
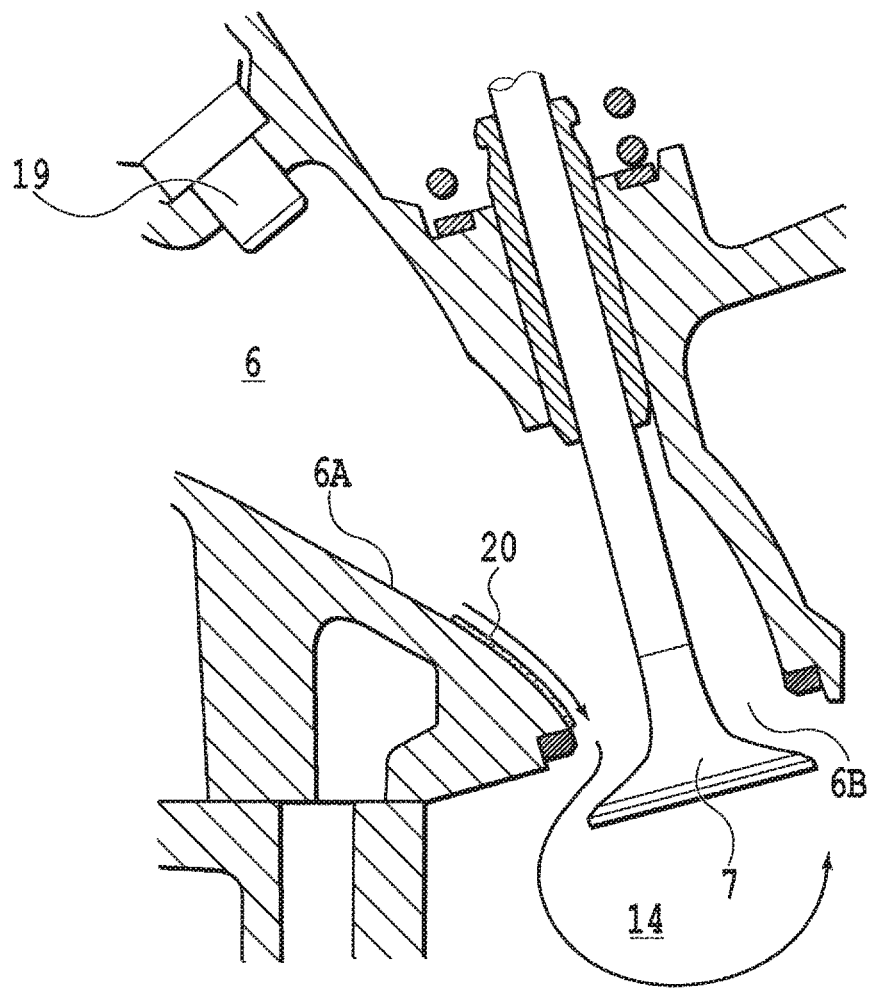
FIG. 5 is a schematic cross-sectional view of the port part showing a situation where the plasma actuator operates and an intake valve is opened.

Consequently, when the plasma actuator 20 is actuated, an ion flow is generated by the operation of the plasma actuator 20 since the fuel droplets Fd are substances with a low dielectric constant, and the fuel droplets Fd are induced by the ion flow, and move in an actuator airflow direction of the arrow D. The movement of the fuel droplets Fd moves the water droplets Wd to the downstream side of the intake port 6 in combination with the inclination of the inner wall surface 6A of the intake port 6. Accordingly, when operation of the plasma actuator 20 is continued for a predetermined period, all the water droplets Wd are pushed out from the plasma actuator 20. In other words, the water droplets Wd are removed from the surface of the plasma actuator 20. Note that the removed water and the non-vaporized fuel accumulate in a concave portion 60 between the outlet 6B of the intake port 6 and a head back surface of the intake valve 7 as shown in FIG. 4A, and is made to flow into the cylinder at the time of valve opening of the intake valve 7.

Here, specific contents of several control examples (1) to (3) in the embodiment in which the engine includes only the fuel injector for port injection will be explained with reference to FIG. 6.

In any of the control examples (1) to (3), when the crank angle detected by the crank angle sensor 41 reaches a predetermined injection start timing (t1), the ECU 100 transmits an injection command signal to the fuel injector for port injection 19, and starts fuel injection by the fuel injector for port injection 19. Simultaneously with this, the ECU 100 applies an AC voltage with a high frequency from the power source 31, and starts operation of the plasma actuator 20. As a result of this, a removal action of the water droplets Wd from the surface of the plasma actuator 20 as described above is started, and the ECU 100 continues this state for a predetermined period until timing (t3).

As to the stop of the fuel injection by the fuel injector for port injection 19, in the control example (1), fuel injection is completed at timing (t2) before operation stop timing (t3) of the plasma actuator 20. In addition, in the control example (2), fuel injection is completed at timing (t4) before valve opening start timing (t5) of the intake valve 7, although the timing (t4) comes after the operation stop timing (t3) of the plasma actuator 20. Furthermore, in the control example (3), fuel injection is continuously executed also after the valve opening start timing (t5) of the intake valve 7, and is completed at timing (t6) before valve closing of the intake valve 7. Note that, in the control example (1), a predetermined amount of fuel injection (hereinafter, referred to as main injection) is executed by predetermined timing (t7) from the valve opening start timing (t5) of the intake valve 7, in addition to the fuel injection executed from the timing (t1) to the timing (t2) (hereinafter, referred to as preliminary injection). The main injection is performed in order to satisfy a fuel injection amount set for obtaining output torque required in accordance with an operation condition of the engine, together with the preliminary injection.

In the above-described control example (2), there has been explained the example in which the above-described preliminary injection and the remaining main injection are continuously executed by so-called asynchronous injection that is not synchronized with opening of the intake valve 7 from the timing (t1) to the timing (t4) during the closing of the intake valve 7; and in the control example (3), there has been explained the example in which the above-described asynchronous injection, the preliminary injection by so-called synchronous injection after the valve opening of the intake valve 7, and the remaining main injection are continuously executed from the timing (t1) to the timing (t6). However, the injection described above is not necessarily required to be continuously executed. Namely, a slight time delay may occur between the preliminary injection executed from the above-described timing (t1) to timing (t2) and the remaining main injection.

Additionally, in the valve opening start timing (t5) when predetermined delay times (t5-t2), (t5-t4), and (t5-t1) have elapsed from the fuel injection stop timing (t2) in the control example (1), the fuel injection stop timing (t4) in the control example (2), and the fuel injection start timing (t1) in the control example (3), respectively, the ECU 100 issues a valve opening command signal of the intake valve 7 and an operation start command signal of the plasma actuator 20, opens the intake valve 7, and actuates the plasma actuator 20. Note that these signals are not necessarily required to be strictly and simultaneously issued. In addition, a valve closing command signal of the intake valve 7 and an operation stop command signal of the plasma actuator 20 are issued at timing (t8) after a lapse of a predetermined period from the timing (t5).

Here, the above-described preliminary injection from the fuel injector for port injection 19 and operation of the plasma actuator 20 are controlled so as to be performed only when it is determined that water has adhered to the surface of the plasma actuator 20 (a water adhesion state). In this case, determination of whether or not the surface of the plasma actuator 20 is in the water adhesion state is based on humidity of the intake air detected by the humidity sensor 42 provided in, for example, the intake passage, and can be executed by the ECU 100. Specifically, humidity of the intake air detected by the humidity sensor 42 is not less than a predetermined humidity (for example, 80%), and thus condensation of water easily occurs, from which the ECU 100 can determine that the plasma actuator 20 is in the water adhesion state. Note that RHU-450, C15-M53R, or the like which is sold by Shinyei Technology Co., Ltd. (Kobe City, Japan) can be exemplified as a humidity sensor included in one or more embodiments described herein.

Second Embodiment

Figure 7:
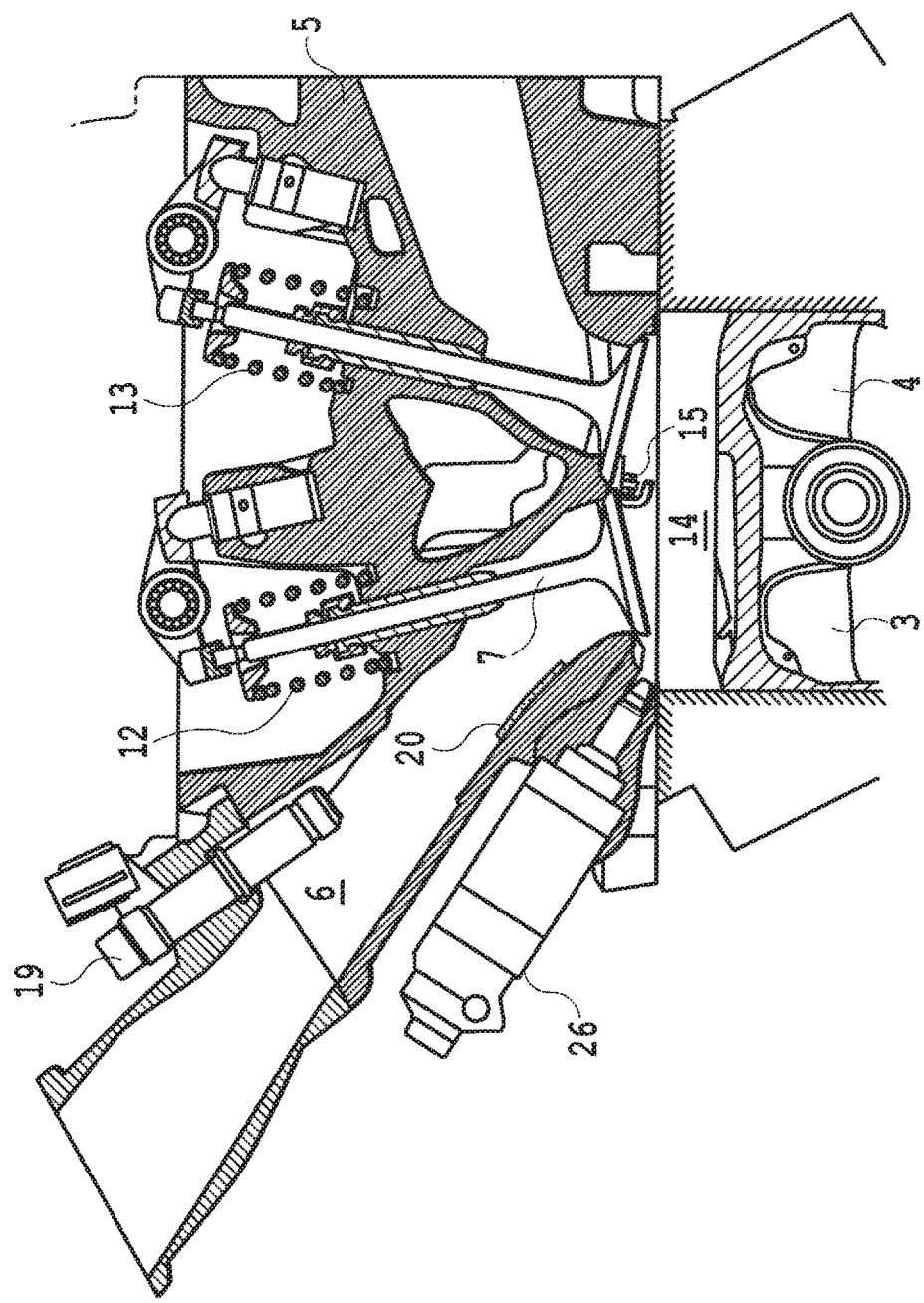
FIG. 7 is a schematic cross-sectional view showing a configuration of a second embodiment applied to an internal combustion engine including a fuel injector for port injection and a fuel injector for in-cylinder injection.

Next, a second embodiment will be explained with reference to FIG. 7. The second embodiment is applied to a so-called dual injection-type internal combustion engine including a fuel injector for in-cylinder injection 26 that injects fuel toward an inside of a cylinder in addition to the above-described fuel injector for port injection 19. Since the fuel injector for in-cylinder injection 26 is only added in hardware, and a configuration and disposition of the plasma actuator 20 are similar to those of the first embodiment, overlapping explanation of the same parts as the first embodiment or functional parts similar thereto is avoided by using the same symbols as used in FIG. 1.

Figure 8:
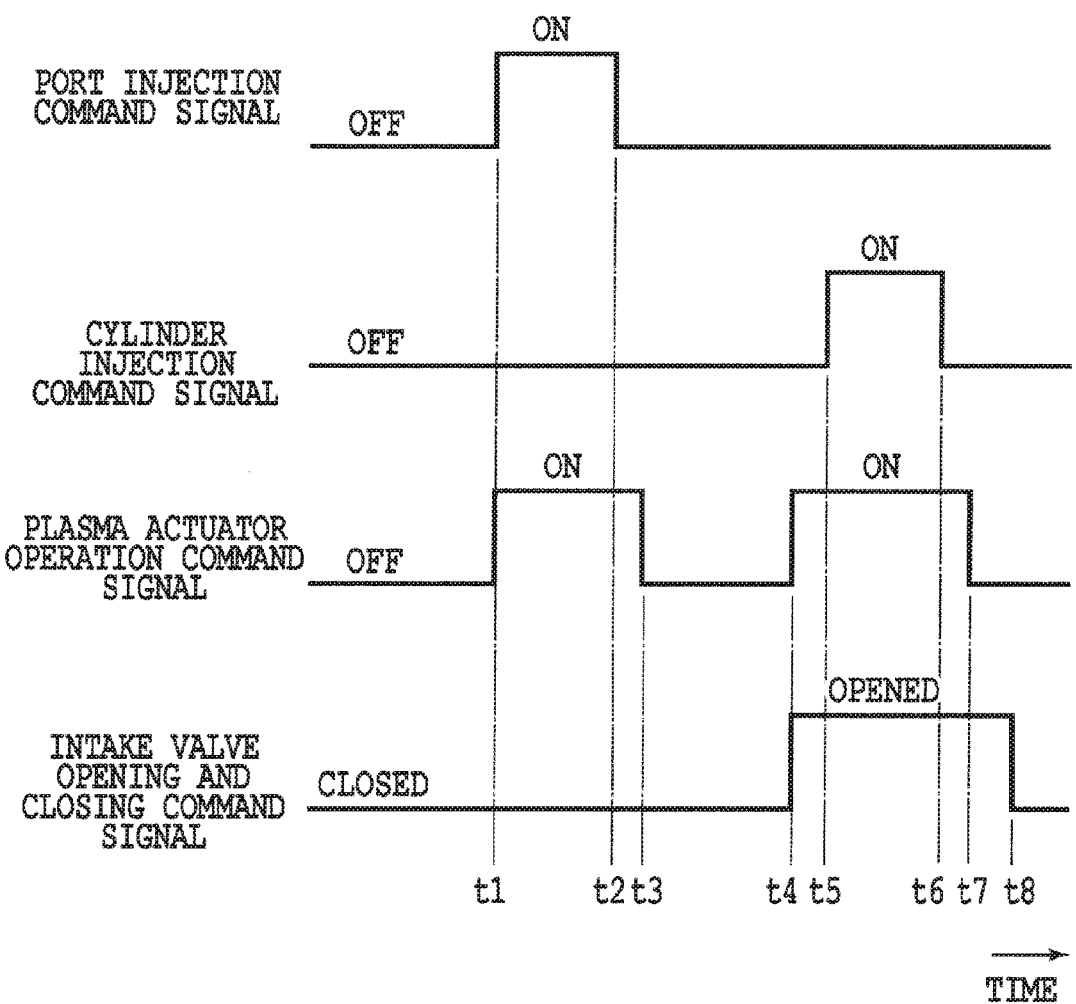
FIG. 8 is a time chart showing contents of control of the second embodiment.

Here, a control example in the dual injection-type internal combustion engine that is the second embodiment will be explained with reference to FIG. 8.

When a crank angle detected by the crank angle sensor 41 reaches the predetermined injection start timing (t1), the ECU 100 transmits an injection command signal to the fuel injector for port injection 19, and starts fuel injection. Simultaneously with this, the ECU 100 applies an AC voltage with a high frequency to the plasma actuator 20 from the power source 31, and starts operation of the plasma actuator 20. As a result of this, a removal action of the water droplets Wd from the surface of the plasma actuator 20 is started, and the ECU 100 continues to keep this state for a predetermined period until timing (t3). As to the stop of fuel injection by the fuel injector for port injection 19, the fuel injection is completed at timing (t2) before operation stop timing (t3) of the plasma actuator 20 in the control example of FIG. 8. In other words, fuel injection referred to as preliminary injection executed from the timing (t1) to the timing (t2) is performed from the fuel injector for port injection 19, the preliminary injection being the same as in the control example (1) of the above-described first embodiment.

Additionally, the ECU 100 issues a valve opening command signal of the intake valve 7 and an operation start command signal of the plasma actuator 20, opens the intake valve 7, and actuates the plasma actuator 20, at a valve opening start timing (t4) after a lapse of a predetermined period from the operation stop timing (t3) of the plasma actuator 20. Note that these signals need not necessarily be strictly simultaneously issued. When the crank angle detected by the crank angle sensor 41 then reaches predetermined cylinder injection start timing (t5), the ECU 100 transmits a cylinder injection command signal to the fuel injector for in-cylinder injection 26, and starts fuel injection. Furthermore, the ECU 100 stops the fuel injection at timing (t6) when a predetermined amount of fuel injection (the above-described main injection) is achieved. The main injection is performed to satisfy a fuel injection amount set in order to obtain output torque required in response to an operation condition of the engine, together with the preliminary injection, as described above. In the control example of FIG. 8, the main injection is performed during an operation period from the timing (t4) to timing (t7) of the plasma actuator 20, and during a valve opening period from the timing (t4) to timing (t8) of the intake valve 7. Note that, in the control example of FIG. 8, the operation stop command signal of the plasma actuator 20 is issued at the timing (t7), and the valve closing command signal of the intake valve 7 is issued at the timing (t8) after the timing (t7), but these commands may be issued simultaneously.

Note that, as in the above-described first embodiment also in the second embodiment, determination is performed whether or not the surface of the plasma actuator 20 is in a water adhesion state based on humidity of the intake air detected by the humidity sensor 42 provided in the intake passage, and only when it is determined that water has adhered to the surface of the plasma actuator 20 (the water adhesion state), control may be performed so that the preliminary injection from the fuel injector for port injection 19 and the operation of the plasma actuator 20 are performed. Furthermore, the plasma actuator 20 is configured so that operation is stopped at the timing (t3), the operation is restarted (refer to FIG. 6) at the same timing (t5) as the valve opening start in the above-described first embodiment, and so that the operation is restarted (refer to FIG. 8) at the same timing (t4) as the valve opening start in the second embodiment. However, the plasma actuator 20 may be continuously actuated without operation thereof being stopped halfway.

Third Embodiment

Figure 9:
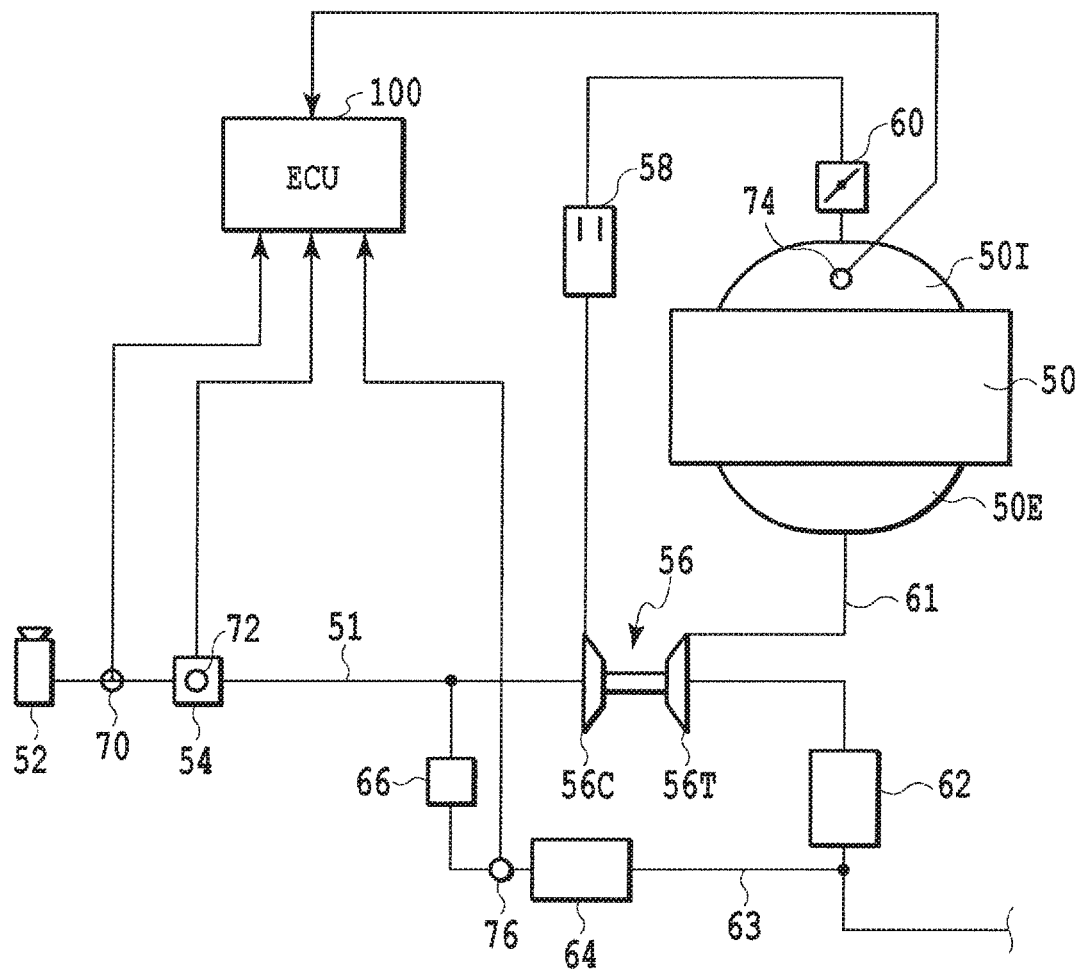
FIG. 9 is a schematic cross-sectional view showing a configuration of a third embodiment applied to an internal combustion engine including an exhaust gas recirculation device (an EGR device)

Moreover, a third embodiment will be explained with reference to FIG. 9. The third embodiment has been applied to an internal combustion engine including an EGR device, and includes a unit configured to estimate water adhesion to a surface of a plasma actuator. In FIG. 9, an engine 50 has an intake manifold 50I and an exhaust manifold 50E. An intake passage 51 communicates with the intake manifold 50I. An air cleaner 52; an air flow meter 54; a compressor 56C of a turbocharger 56; an intercooler 58; an electrically controlled throttle body 60; and a surge tank (not shown) are disposed in the intake passage 51 in order from an upstream side thereof. In addition, an exhaust passage 61 communicates with the exhaust manifold 50E. A turbine 56T of the turbocharger 56; a three-way catalyst 62; and an exhaust muffler (not shown) are disposed in the exhaust passage 61 in order from an upstream side thereof. Furthermore, an EGR passage 63 is branched from the exhaust passage 61 of a downstream of the three-way catalyst 62, and is made to join the intake passage 51 in an upstream of the compressor 56C of the turbocharger 56. An EGR cooler 64 and an EGR control valve 66 are disposed in the EGR passage 63 in order from an upstream side thereof.

In addition, in the third embodiment, as components of a unit configured to estimate water adhesion to the surface of the plasma actuator, a humidity sensor 70 for measuring relative humidity A (%) of an outside air is disposed in the air cleaner 52 or the intake passage 51 of a downstream of the air cleaner 52, a (first) temperature sensor 72 for measuring an outside air temperature Ta (° C.) is similarly disposed in the air flow meter 54, a (second) temperature sensor 74 for measuring an intake air temperature Tin (° C.) in the intake manifold 50I is disposed in the intake manifold 50I, and furthermore, a (third) temperature sensor 76 for measuring a temperature Tegr (° C.) of EGR gas closer to a downstream than an EGR cooler 64 outlet is disposed in the EGR passage 63. These humidity sensor 70 and first to third temperature sensors 72, 74, and 76 are electrically connected to the ECU 100, and the ECU 100 constitutes a water adhesion estimation unit to the surface of the plasma actuator by executing functions of a control procedure to be explained below.

Figure 10:
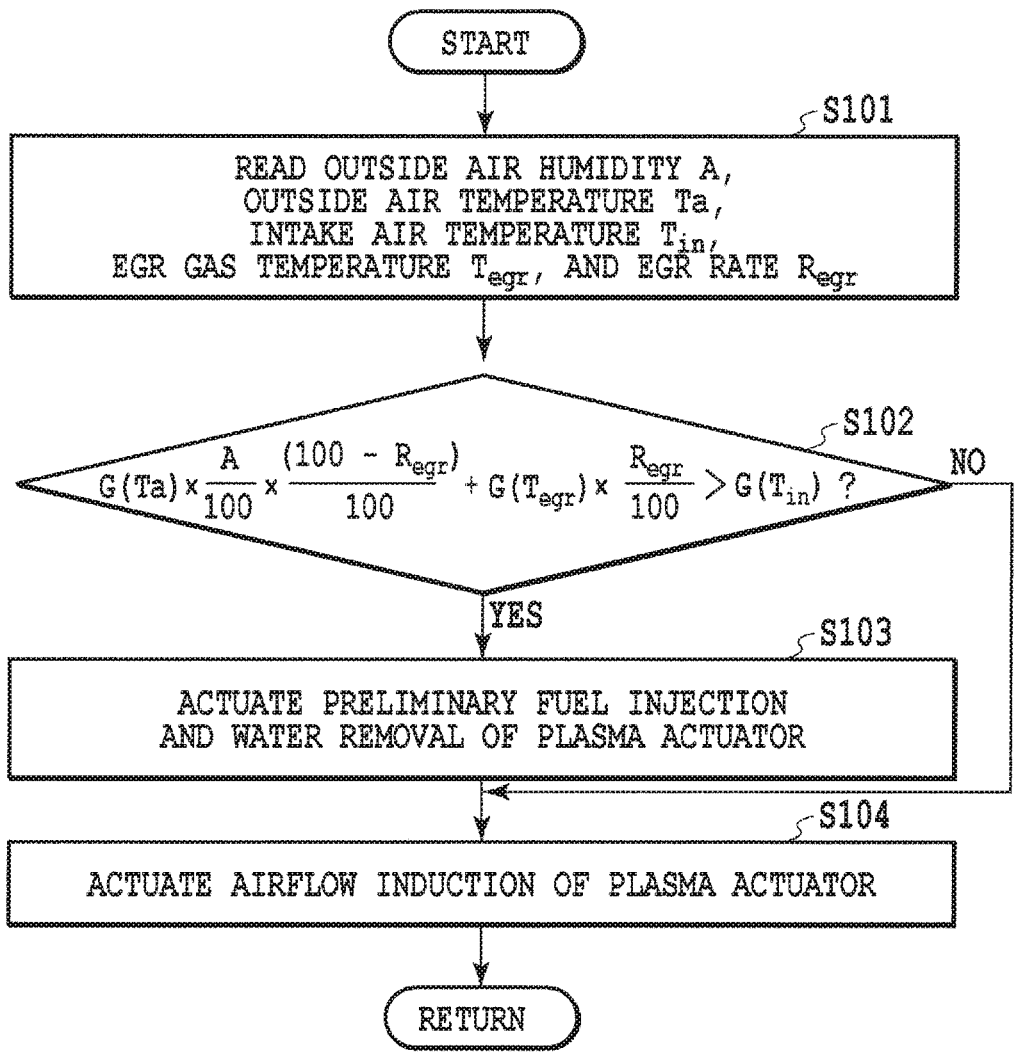
FIG. 10 is a flow chart showing one example of control of the third embodiment.

Here, one example of the control procedure in relation to the water adhesion estimation unit to the surface of the plasma actuator in the third embodiment will be explained with reference to a flow chart of FIG. 10.

When control executed at a predetermined period starts, in step S101, the ECU 100 reads the outside air humidity A (%), the outside air temperature Ta (° C.), the intake air temperature Tin (° C.) in the intake manifold 50I, and the EGR gas temperature Tegr (° C.) closer to the downstream than the EGR cooler 64 outlet from output signals from the humidity sensor 70 and the first to third temperature sensors 72, 74, and 76. Simultaneously, the ECU 100 reads an EGR rate Regr (%) in which an EGR gas amount relative to an intake amount suctioned by the engine 50 is expressed in percentage. However, the EGR rate Regr (%) is previously obtained by an experiment corresponding to an engine speed and an engine load which indicate an operation condition of the engine 50, and is read from data stored in a control map of the ECU 100 in accordance with a current operation condition of the engine 50.

Next, in step S102, a sum of an amount of water vapor contained in the outside air introduced via the air cleaner 52 of intake airs suctioned by the engine 50, and an amount of water vapor contained in the EGR gas made to join the outside air is compared with a containable amount of saturated water vapor when a temperature of an intake air of the intake manifold 50I is the temperature Tin (° C.) in the intake manifold 50I immediately before the intake port 6, and determination of whether or not the sum exceeds the amount of saturated water vapor is performed. Specifically explained, if an outside air temperature is Ta (° C.) and outside air humidity is A (%), an amount of saturated water vapor at the temperature Ta is G (Ta) (g/m³), and an amount of water vapor contained in the outside air is G (Ta)×A/100 (g/m³). In addition, if the EGR rate is Regr (%), an amount of water vapor contained in the outside air of intake airs suctioned by the engine 50 is G(Ta)×A/100×(100−Regr)/100 (g/m³), and an amount of water vapor contained in the EGR gas of the temperature Tegr (° C.) is G(Tegr)×Regr/100 (g/m³). Additionally, since an amount of saturated water vapor of an intake air of the intake manifold 50I is G (Tin) (g/m³) at the temperature Tin (° C.) of the intake manifold 50I, determination is performed by comparing these amounts. When a sum of the above-described amounts of water vapor exceeds an amount of saturated water vapor that can be contained in the intake air in the intake manifold 50I, water vapor as much as an amount exceeding the amount of saturated water vapor becomes hard to be held in the intake air and is condensed, and thus it becomes more likely that the water vapor adheres as water droplets to the inner wall surface 6A of the intake port 6 including the surface of the plasma actuator 20 of an downstream of the intake manifold 50I.

Consequently, in step S102, the above-described determination using (Formula 1) G (Ta)×A/100×(100−Regr)/100+G(Tegr)×Regr/100>G(Tin)? is performed. If the sum of the above-described amounts of water vapor exceeds the amount of saturated water vapor that can be contained in the intake manifold 50I, i.e., if the determination is affirmative (YES), it is estimated that water has adhered to the surface of the plasma actuator 20, and processing proceeds to step S103. Preliminary fuel injection from the fuel injector for port injection 19 is performed in step S103, and water removal operation of the plasma actuator 20 is performed. After the water removal operation of the plasma actuator 20 in this step S103, processing proceeds to step S104, and only airflow induction operation of the plasma actuator 20 is performed in combination with the valve opening of the intake valve 7.

Meanwhile, if in the determination instep S102, the sum of the above-described amounts of water vapor does not exceed the amount of saturated water vapor that can be contained in the intake manifold 50I, i.e., if the determination is negative (NO), processing proceeds to step S104 without proceeding to step S103, and only the airflow induction operation of the plasma actuator 20 is performed in combination with the valve opening of the intake valve 7.

Note that, although the above-described water adhesion estimation unit estimates whether or not water has adhered to the surface of the plasma actuator 20, (Formula 1) is transformed, an amount as much as the sum of the above-described amounts of water vapor exceeding the amount of saturated water vapor that can be contained in the intake air in the intake manifold 50I is calculated, and thus a water adhesion amount Xo may be estimated. In this modified embodiment, magnitude of electrical energy supplied from the power supply device 30 to the plasma actuator 20 for the water removal operation of the plasma actuator 20 executed in the above-described step S103 is changed according to magnitude of the water adhesion amount Xo. For example, a voltage supplied from the power supply device 30 is raised in proportion to the fact that the water adhesion amount Xo becomes larger, and thus a drive force for water removal by the plasma actuator 20 may be increased. As a result of this, even a large water adhesion amount Xo can be removed in a short period.

Fourth Embodiment

Figure 11:
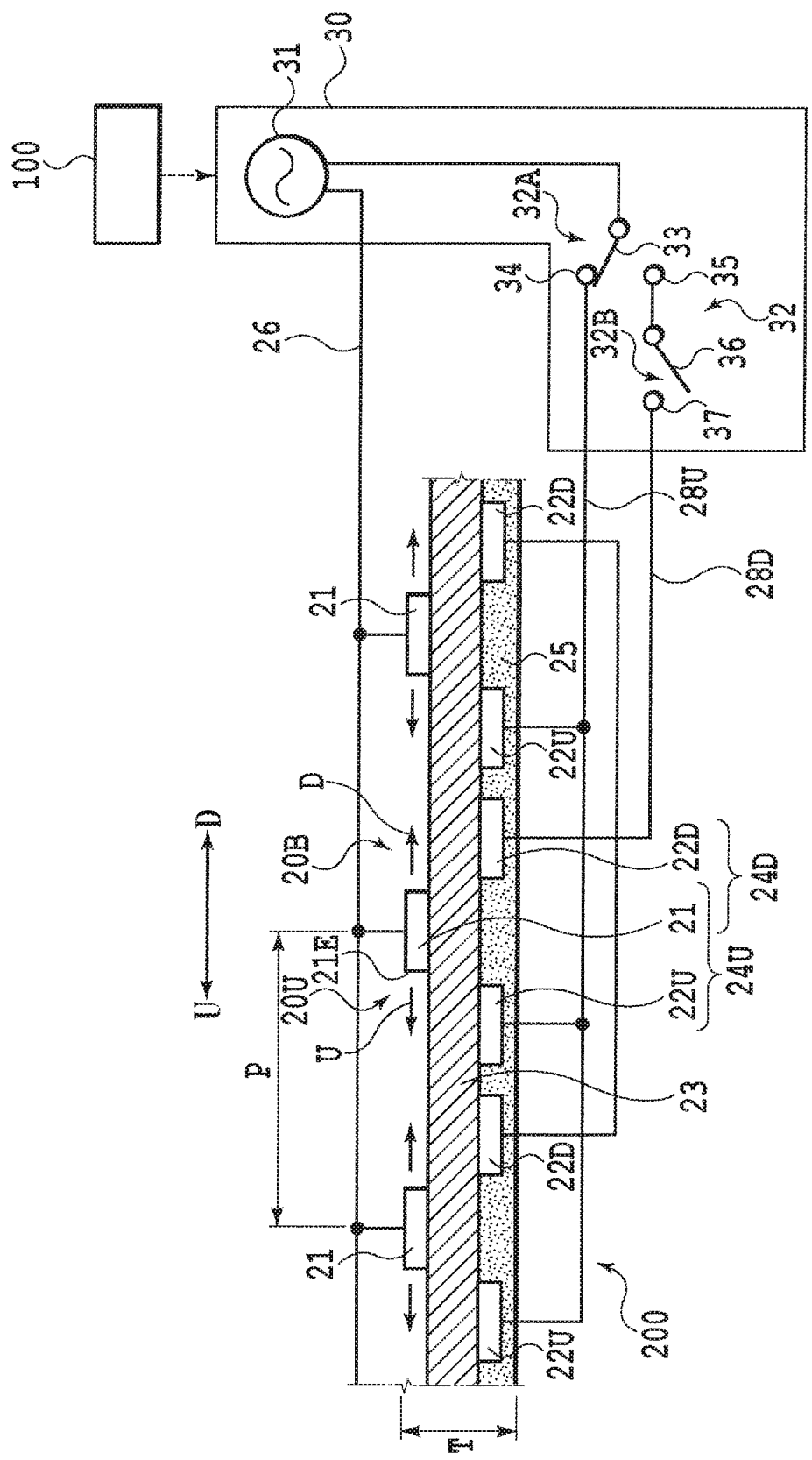
FIG. 11 is a cross-sectional view showing one modification of a plasma actuator used for a fourth embodiment.

Furthermore, a fourth embodiment will be explained with reference to FIG. 11. The fourth embodiment relates to a mode that controls operation of a plasma actuator after valve opening of an intake valve in order to more properly strengthen a desired swirl flow or tumble flow generated in a combustion chamber, and the embodiment uses a modification of the above-described plasma actuator 20. The plasma actuator 20 shown in FIG. 2 includes only a pair of electrodes including the front surface electrode 21 and the back surface electrode 22, and generates the actuator airflow only in the arrow D direction that is the downstream side of the intake passage. However, a modification 200 explained here includes a plurality of electrode pairs, in which a first plasma actuator 20D that generates an actuator airflow in the arrow D direction that is a downstream side of an intake passage, and a second plasma actuator 20U that generates an actuator airflow in an arrow U direction that is an upstream side of the intake passage are combined and integrally configured.

More specifically, the first plasma actuator 20D is constituted of a plurality of first electrode units 24D each including: a pair of electrodes including the front surface electrode 21 and a first back surface electrode 22D; and the thin plate-like dielectric 23 disposed between the pair of these electrodes. The second plasma actuator 20U is similarly constituted of a plurality of second electrode units 24U each including: a pair of electrodes including the front surface electrode 21 and a second back surface electrode 22U; and the thin plate-like dielectric 23 disposed between the pair of these electrodes. The front surface electrode 21 and the dielectric 23 are common to the first and the second plasma actuators 20D and 20U.

The first back surface electrode 22D is aligned to be offset in an illustrated D direction with respect to the front surface electrode 21, and a gap is formed between facing-side edges of the both electrodes. Additionally, the plurality of first electrode units 24D is aligned at regular intervals by a predetermined pitch P in the D direction. In contrast, the second back surface electrode 22U is aligned to be offset in the illustrated U direction with respect to the front surface electrode 21, and a gap is formed between facing-side edges of the both electrodes. Additionally, the plurality of second electrode units 24U is also aligned at regular intervals by the predetermined pitch P in the U direction. Furthermore, the first and the second back surface electrodes 22D and 22U are embedded in the insulating layer 25 provided on a back surface of the dielectric 23, respectively.

Moreover, the power supply device 30 includes: the common power source 31 for applying an AC voltage to the first and the second plasma actuators 20D and 20U; and a changeover switch 32 interposed between the first and the second plasma actuators 20D and 20U, and the power source 31. Here, the plurality of front surface electrodes 21 is connected to each other and also to the power source 31, by a common wiring 26. The plurality of first back surface electrodes 22D is also connected to each other by a first wiring 28D, and the plurality of second back surface electrodes 22U is also connected to each other by a second wiring 28U. Additionally, the first and the second wirings 28D and 28U are connected to the power source 31 via the changeover switch 32.

The changeover switch 32 has a first switch 32A and a second switch 32B. The first switch 32A has a movable contact 33 and two fixed contacts 34 and 35, and the second switch 32B has a movable contact 36 and one fixed contact 37. The movable contact 33 is connected to the power source 31, and the fixed contact 34 is connected to the plurality of second back surface electrodes 22U via the second wiring 28U. The fixed contact is connected to the plurality of first back surface electrodes 22D via the first wiring 28D, and the fixed contact 35 is connected to the movable contact 36.

In the fourth embodiment, the changeover switch 32 is switched on the basis of a command signal from the ECU 100, and thus operation of the first and the second plasma actuators 20D and 20U is switched, and generation states of a first actuator airflow and a second actuator airflow are switched. Namely, when the movable contact 33 is connected to the fixed contact 34 (an illustrated state), only the second plasma actuator 20U is made into an operation state (is turned on), and an actuator airflow in the U direction is generated. When the movable contact 33 is connected to the fixed contact 35, and the movable contact 36 is connected to the fixed contact 37, only the first plasma actuator 20D is made into an operation state, and an actuator airflow in the arrow D direction is generated. When the movable contact 33 is connected to the fixed contact 35, and the movable contact 36 is disconnected from the fixed contact 37, both the plasma actuators are made into a non-operation state, i.e., they are turned off. Note that a configuration of the changeover switch 32 is arbitrary, and that the configuration may have a mechanical contact, or may include an electrical switching circuit.

In the above-described fourth embodiment, the modification 200 including the first and the second plasma actuators 20D and 20U can be appropriately disposed at a position in the circumferential direction of the inner wall surface 6A of the intake port 6 corresponding to a mode of an airflow such as the tumble flow in the combustion chamber required for the engine. For example, only one modification 200 may be disposed at the position in the circumferential direction of the inner wall surface 6A shown in FIG. 1, and in addition to that, the modification 200 may be disposed in pairs on the inner wall surface 6A facing a diameter direction. As described above, when only one modification 200 is disposed, the changeover switch 32 may be controlled in order to generate the actuator airflow suitable for strengthening the tumble flow and the like generated in the combustion chamber according to the operation condition of the engine, or the like. Furthermore, as to the modifications 200 disposed in a pair relation, one modification 200 may be made to generate the actuator airflow going in the arrow D direction of the downstream side of the intake port 6 by being used as the first plasma actuator 20D, and the other modification 200 may be made to generate the actuator airflow going in the arrow U direction of the upstream side of the intake port 6 by being used as the second plasma actuator 20U.

Hereinbefore, although particular embodiments have been explained, the claimed subject matter is not limited to such embodiments, and it is needless to say that all modifications, applications, and equivalents of the aspects of the present disclosure are encompassed in the claimed subject matter.

What is claimed is:

1. An airflow control device of an internal combustion engine comprising:
    a plasma actuator that is provided in an intake passage, and that induces an airflow by being actuated;
    a fuel injector for port injection which is provided in the intake passage so as to inject fuel toward said plasma actuator or an upstream position thereof; and
    a control unit for controlling said plasma actuator and said fuel injector for port injection, wherein
    said control unit is configured to actuate said plasma actuator after valve opening of an intake valve, in addition to causing said fuel injector for port injection to perform an operation of fuel injection, and causing said plasma actuator to perform operation so as to induce the airflow in a direction toward a downstream side of said intake passage, in at least a part of a valve closing period of said intake valve.

2. An airflow control device of an internal combustion engine comprising:
    a plasma actuator that is provided in an intake passage, and that induces an airflow by being actuated;
    a fuel injector for port injection which is provided in the intake passage so as to inject fuel toward said plasma actuator or an upstream position thereof; and
    a fuel injector for in-cylinder injection which is provided so as to directly inject fuel to an inside of a cylinder; and
    a control unit for controlling said plasma actuator, said fuel injector for port injection, and said fuel injector for in-cylinder injection, wherein
    said control unit is configured to actuate said plasma actuator during a valve opening period after valve opening of an intake valve, and to perform an operation of fuel injection by said fuel injector for in-cylinder injection, in addition to causing said fuel injector for port injection to perform an operation of fuel injection, and causing said plasma actuator to perform an operation so as to induce the airflow in a direction toward a downstream side of said intake passage, in at least a part of a valve closing period of said intake valve.

3. The airflow control device of the internal combustion engine according to claim 1, further comprising a determination unit configured to determine whether or not water has adhered to a surface of said plasma actuator, wherein
    said control unit is configured to cause said fuel injector for port injection to perform an operation of fuel injection, and to cause said plasma actuator to perform an operation so as to induce the airflow in the direction toward the downstream side of said intake passage, in at least the part of the valve closing period of said intake valve, only when said determination unit determines that water has adhered.

4. The airflow control device of the internal combustion engine according to claim 2, further comprising a determination unit configured to determine whether or not water has adhered to a surface of said plasma actuator, wherein
    said control unit is configured to cause said fuel injector for port injection to perform an operation of fuel injection, and to cause said plasma actuator to perform an operation so as to induce the airflow in the direction toward the downstream side of said intake passage, in at least the part of the valve closing period of said intake valve, only when said determination unit determines that water has adhered.

5. The airflow control device of the internal combustion engine according to claim 3, wherein said determination unit performs determination based on a measurement value of a humidity sensor provided in order to measure humidity of an intake air in said intake passage.

6. The airflow control device of the internal combustion engine according to claim 4, wherein said determination unit performs determination based on a measurement value of a humidity sensor provided in order to measure humidity of an intake air in said intake passage.

7. The airflow control device of the internal combustion engine according to claim 3, wherein said determination unit performs determination based on an estimation result of a unit configured to estimate water adhesion to the surface of said plasma actuator by using a humidity and a temperature of an outside air, a temperature of EGR gas at an EGR cooler outlet and an EGR rate, and a temperature of an intake air in an intake manifold.

8. The airflow control device of the internal combustion engine according to claim 4, wherein said determination unit performs determination based on an estimation result of a unit configured to estimate water adhesion to the surface of said plasma actuator by using a humidity and a temperature of an outside air, a temperature of EGR gas at an EGR cooler outlet and an EGR rate, and a temperature of an intake air in an intake manifold.

* * * * *

UNITED STATES PATENT AND TRADEMARK OFFICE
CERTIFICATE OF CORRECTION

| | |
|---|---|
| PATENT NO. | : 9,835,122 B2 |
| APPLICATION NO. | : 15/001608 |
| DATED | : December 5, 2017 |
| INVENTOR(S) | : Hirokazu Ito |

It is certified that error appears in the above-identified patent and that said Letters Patent is hereby corrected as shown below:

In the Specification

In Column 2, Line 26, delete "apart" and insert --a part--, therefor.

In Column 13, Line 11, after "fixed contact", insert --37--.

Signed and Sealed this
Twenty-fourth Day of April, 2018

Andrei Iancu
*Director of the United States Patent and Trademark Office*